United States Patent Office.

CHARLES WULSTEN, OF LAFAYETTE, INDIANA.

Letters Patent No. 79,045, dated June 16, 1868.

IMPROVED PRINTERS' INK.

*The Schedule referred to in these Letters Patent and making part of the same.*

TO ALL WHOM IT MAY CONCERN:

Be it known that I, CHARLES WULSTEN, of Lafayette, in the county of Tippecanoe, and State of Indiana, have invented a new and improved Printing-Ink; and I do hereby declare that the following is a full, clear, and exact description thereof, which will enable others skilled in the art to make and use the same, reference being had to the accompanying drawings, forming part of this specification.

This invention relates to a new and improved method of making printing-ink, whereby the cost of the same is greatly cheapened.

It consists in the partial substitution of the silicate of alumina, or kaolin, prepared with the sulphate of zinc, with or without dilute sulphuric acid, for lamp-black, vermillion, or other of the coloring-matters now commonly in use, whereby the cost of the ink is lessened.

The alumina or kaolin is prepared by adding about ninety-four per centum of the silicate of alumina or kaolin to about three per centum of the dry sulphate of zinc, and permitting the mixture to stand from three to twenty-four hours. Then add three per centum of dilute sulphuric acid, if acid is used.

Let the whole stand from one to two hours, when it will readily combine with lamp-black, or any other of the coloring-matters now commonly in use.

Take sixty-six and two-thirds per centum of the alumina or kaolin, prepared as above described, and thirty-three and one-third per centum of lamp-black, or other coloring-matter, according to the color required. To one hundred per centum of the above dry materials, add one hundred per centum of varnish, such as is now commonly in use, grind the whole well together, when the same will be ready for use.

The alumina or kaolin thus prepared has become a colorless substance, capable of taking any color required.

Made as above described, it constitutes a cheap and better ink, of any required color, for printers' use, and for all the purposes for which printers' ink is now used, the advantages of which are, that the same can be made from thirty to sixty per centum less cost, that the same dries quicker without smutting or crocking, and the same may be spread or distributed more easily and smoothly than the inks now commonly in use.

I claim as new, and desire to secure by Letters Patent—

An ink, for all the purposes for which printers' ink is used, in which the silicate of alumina, white clay, or Jersey clay, or kaolin, prepared with sulphate of zinc, and with or without dilute sulphuric acid, is partially substituted for lamp-black, blue, green, or other coloring-matters, with drying-materials and varnish, prepared as and in the proportions substantially as shown and described, and for the purposes set forth.

The above specification of my invention signed by me, this   day of   , 1867.

CHARLES WULSTEN.

Witnesses:
  GEO. H. PALMER,
  ALEX. F. ROBERTS.